United States Patent [19]

Schwerzel et al.

[11] Patent Number: 5,188,716
[45] Date of Patent: Feb. 23, 1993

[54] HEAT-CURABLE COATING COMPOSITION FOR CATHODIC ELECTROCOATING

[75] Inventors: Thomas Schwerzel, Meckenheim; Hans Schupp, Worms; Klaus Huemke, Ludwigshafen; Dieter Faul, Bad Durkheim; Ulrich Heimann, Muenster, all of Fed. Rep. of Germany

[73] Assignee: BASF Lack + Farben Aktiengesellschaft, Münster, Fed. Rep. of Germany

[21] Appl. No.: 476,881

[22] Filed: Feb. 8, 1990

[51] Int. Cl.$^5$ .............................................. C25D 13/04
[52] U.S. Cl. ................................. 204/181.7; 525/127; 525/128; 524/901
[58] Field of Search ................... 528/45; 524/591, 901; 204/181.7; 525/127, 128

[56] References Cited

U.S. PATENT DOCUMENTS

| | | | |
|---|---|---|---|
| 4,296,010 | 10/1981 | Tominaga | 260/29.2 TN |
| 4,576,979 | 3/1986 | Schupp et al. | 523/404 |
| 4,608,416 | 8/1986 | Schupp et al. | 204/181.7 |
| 4,713,406 | 12/1987 | Schupp et al. | 523/415 |
| 4,722,969 | 2/1988 | Huynh-Tran et al. | 525/123 |
| 4,752,631 | 6/1988 | Schupp et al. | 523/414 |
| 4,769,420 | 9/1988 | Schwerzel et al. | 525/113 |
| 4,781,808 | 11/1988 | Geist et al. | 204/181.7 |
| 4,865,705 | 9/1989 | Hendriux et al. | 204/181.7 |
| 4,871,808 | 10/1989 | Schwerzel et al. | 525/113 |
| 4,892,913 | 1/1990 | Paar | 525/452 |

FOREIGN PATENT DOCUMENTS

| | | |
|---|---|---|
| 0236050 | 9/1987 | European Pat. Off. . |
| 3311516 | 10/1984 | Fed. Rep. of Germany . |
| 2352845 | 12/1977 | France . |

*Primary Examiner*—John Niebling
*Assistant Examiner*—Kishor Mayekar
*Attorney, Agent, or Firm*—Keil & Weinkauf

[57] ABSTRACT

A heat-curable coating composition for cathodic electrocoating which becomes water-thinnable on protonation with an acid contains (A) 50-95% by weight of a polycondensation or polyaddition product having an average molecular weight of from 500 to 20,000 and containing primary and/or secondary hydroxyl groups and primary, secondary and/or tertiary amino groups, and (B) 5-50% by weight of a crosslinking agent obtainable by reacting a) an aliphatic polyhydroxy compound and
b) an aromatic polyhydroxy compound with
c) an aliphatic and/or cycloaliphatic polyisocyanate and
d) a blocking agent.

8 Claims, No Drawings

HEAT-CURABLE COATING COMPOSITION FOR CATHODIC ELECTROCOATING

The present invention relates to a heat-curable coating composition for cathodic electrocoating, which becomes water-thinnable on protonation with an acid and contains a mixture of a polycondensation or polyaddition product with a crosslinking agent essentially obtainable by reacting a mixture of an aliphatic and an aromatic polyhydroxy compound with an aliphatic and/or cycloaliphatic polyisocyanate.

Electrocoating systems which contain blocked polyisocyanate crosslinking agents are known and are described for example in U.S. Pat. No. 4,296,010. The disadvantage with the aromatic polyisocyanate compounds described therein is that the baked coats tend to yellow. This leads in particular in the case of light-colored topcoats to unattractive spots on the outside. However, these crosslinkers based on aromatic isocyanates have the great advantage that they confer good corrosion protective properties on the particular coating system. The baking temperatures for alcohol-blocked aromatic isocyanate systems of the prior art are within the range from 165° to 185° C. It is true that aromatic crosslinkers based on diphenylmethane diisocyanate as isocyanate component are described as non-yellowing in EP-A-236 050, but, because crosslinking proceeds through cleavage of urethane to isocyanate, they require a baking temperature of 170° C.

Crosslinkers prepared from aliphatic polyisocyanates and amines as blocking agents, as described for example in DE-A-3 311 516, do not cause yellowing of the coats after baking. They also have the advantage that they can be crosslinked at as low as 140°-160° C. by isocyanate formation from a urea. However, it is found that the corrosion protection afforded by coatings based on crosslinkers of this kind is worse than if aromatic isocyanate crosslinkers are used.

It is an object of the present invention to develop crosslinkers for a cathodic electrocoating composition which can be processed at a low baking temperature and produces coatings which are free of yellowing.

We have found that this object is achieved according to the present invention by a heat-curable coating composition for cathodic electrocoating which becomes water-thinnable on protonation with an acid, containing
(A) 50-95% by weight of a polycondensation or polyaddition product having an average molecular weight of from 500 to 20,000 and containing primary and/or secondary hydroxyl groups and primary, secondary and/or tertiary amino groups, and
(B) 5-50% by weight of a crosslinking agent obtainable by reacting
  a) an aliphatic polyhydroxy compound and
  b) an aromatic polyhydroxy compound with
  c) an aliphatic and/or cycloaliphatic polyisocyanate and
  d) a blocking agent.

There now follow details concerning the formative components:

Suitable formative components (A) are known and described for example in U.S. Pat. No. 4,713,406, U.S. Pat. No. 4,752,631, U.S. Pat. No. 4,871,808 and U.S. Pat. No. 4,769,420.

Component (A) is used in an amount of 50-95% by weight, preferably 60-80% by weight.

Suitable formative components a) for preparing component (B) are aliphatic polyhydroxy compounds having molecular weights $\overline{M}_n$ of 62-8,000.

Compounds of this type are for example di- and polyols and also polyether- and polyester-polyols which may contain further functional groups.

Suitable di- and polyols are for example ethylene glycol, trimethylolmethane, pentaerythritol, trimethylolethane, trimethylolpropane, glycerol and other polyhydroxy compounds of alkanes or cycloalkanes or N-alkyldiethanolamines such as N-methyldiethanolamine. It is also possible to use mixtures of these di- and polyols.

Suitable polyetherols can be prepared by reacting one or more alkylene oxides having from 2 to 4 carbon atoms in the alkylene moiety with a starter molecule which contains two active hydrogen atoms. Suitable alkylene oxides are for example ethylene oxide, 1,2-propylene oxide, epichlorohydrin, 1,2-butylene oxide and 2,3-butylene oxide. Preference is given to using ethylene oxide and mixtures of 1,2-propylene oxide and ethylene oxide. The alkylene oxides can be used individually, alternately in succession or as mixtures. Suitable starter molecules are for example polyols, e.g. trimethylolmethane, pentaerythritol, trimethylolethane, trimethylolpropane, glycerol or other polyhydroxy compounds of alkanes or cycloalkanes, but also water, aminoalcohols, such as N-alkyldiethanolamines, e.g. N-methyldiethanolamine, and diols, such as ethylene glycol, 1,3-propylene glycol, 1,4-butanediol and 1,6-hexanediol. It is also possible to use mixtures of starter molecules. If the starter molecules contain basic groups capable of salt formation, it is also possible to disperse the components (B) separately and to add their dispersion to a dispersion of component (A). It is also possible to prepare a dispersible component (B) by introducing basic groups capable of salt formation via component b), c) or d).

Suitable polyetherols are also the hydroxylcontaining polymerization products of tetrahydrofuran.

The polyetherols have molecular weights of from 100 to 8,000, preferably from 200 to 2,000. They can be used not only individually but also in the form of mixtures with one another.

Suitable polyesterpolyols can be prepared for example from dicarboxylic acids of from 2 to 12 carbon atoms and polyhydric alcohols. Suitable dicarboxylic acids are for example aliphatic dicarboxylic acids, such as succinic acid, glutaric acid, adipic acid, suberic acid, azelaic acid and sebacic acid, and aromatic dicarboxylic acids, such as phthalic acid, isophthalic acid and terephthalic acid. The dicarboxylic acids can be used individually or in mixtures, for example in the form of a succinic, glutaric and adipic acid mixture. To prepare the polyester polyols it may be advantageous to use instead of carboxylic acids the corresponding carboxylic acid derivatives, such as carboxylic esters having from 1 to 4 carbon atoms in the alcohol moiety, carboxylic anhydrides or carbonyl chlorides. Examples of polyhydric alcohols are glycols of from 2 to 10, preferably from 2 to 6, carbon atoms, such as ethylene glycol, diethylene glycol, 1,4-butanediol, 1,5-pentanediol, 1,6-hexanediol, 1,10-decanediol, 2,2-dimethyl-1,3-propanediol, 1,3-propanediol and dipropylene glycol. Depending on the desired properties, the polyhydric alcohols can be used alone or mixed with one another.

It is also possible to use esters of carbonic acid with the diols mentioned, in particular those of from 4 to 6 carbon atoms, such as 1,4-butanediol and/or 1,6-hexanediol, condensation products of ω-hydroxycarboxylic acids, for example ω-hydroxycaproic acid, and preferably polymerization products of lactones, for example substituted or unsubstituted ε-caprolactones.

Preferred polyesterols are ethanediol polyadipates, 1,4-butanediol polyadipates, ethanediol/1,4-butanediol polyadipates, 1,6-hexanediol/neopentylglycol polyadipates, 1,6-hexanediol/1,4-butanediol polyadipates and polycaprolactones.

The polyesterols have molecular weights of from 500 to 8,000, preferably from 400 to 3,000.

Suitable aromatic polyhydroxy compounds b) are for example phenols of two or more phenolic hydroxyl groups, such as 2,2'-dihydroxybi-phenyl, 4,4'-dihydroxybiphenyl and bisphenols of the general formula

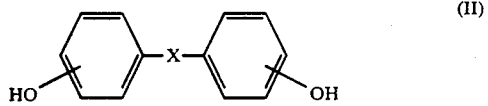

(II)

where the hydroxyl groups are ortho or para to X and X is a straight-chain or branched, divalent aliphatic radical of from 1 to 3 carbon atoms or $SO_2$, CO, O or $CH_2$—$NRCH_2$ (where R is alkyl of from 1 to 16 carbon atoms).

Examples of suitable bisphenols are 2,2-bis(4-hydroxyphenyl)propane (bisphenol A), 4,4'-dihydroxybenzophenone, 4,4'-dihydroxyphenyl sulfone, 1,1-bis(4hydroxyphenyl)ethane, 1,1-bis(4-hydroxyphenyl)isobutane, 2,2-bis(4-hydroxy-tert-butylphenyl)propane, bis(4-hydroxynaphthyl)methane and 1,5-dihydroxyna-phthalene.

Preference is given to using bisphenol A, 4,4'-dihydroxybenzophenone and 4,4'-dihydroxyphenyl sulfone.

Suitable aliphatic and/or cycloaliphatic polyisocyanates c) are for example hexamethylene diisocyanate, hexane 1,5-diisocyanate, isophorone diisocyanate, 1,4-cyclohexane diisocyanate, 1-methyl-2,4- or 2,6-cyclohexane diisocyanate and the corresponding isomeric mixtures, 4,4-, 2,4- and 2,2-dicyclohexylmethane diisocyanate and the corresponding isomeric mixtures. Preference is given to using the isocyanates having isocyanate groups of different reactivities, such as isophorone diisocyanate, hexane 1,5-diisocyanate and 1-methyl-2,4-cyclohexane diisocyanate.

Suitable blocking agents d) are in particular secondary aliphatic and cycloaliphatic monoamines such as dimethylamine, diethylamine, dipropylamine, dibutylamine, dipentylamine, dihexylamine and isomers thereof, such as diisopropylamine, or else asymmetric ones such as N-ethyl-1-propylamine, N,N-dimethylaminopropylamine, N,N-dimethylaminoethylamine and also primary and/or secondary amines which carry tertiary amino groups. Examples of suitable cycloaliphatic amines are dicyclohexylamine and dicyclopentylamine. It is also possible to use morpholine and N-alkylpiperazines.

The reaction takes place under conditions customary for isocyanate reactions, involving reaction temperatures of from room temperature to about 150° C. If the starting materials and the product are liquid at the reaction temperature, it is possible to do without a solvent, but in general the reaction is carried out in a solvent which is inert towards isocyanate, alcohol and amino groups, such as an ether, ester, ketone or hydrocarbon. The order of addition of components is basically freely chooseable, but preferably components a), b) and c) are first reacted with one another before component d) is added.

The amounts of components a), b), c) and d) are chosen in such a way that the sum of the equivalents of a), b) and d) is not less than the number of equivalents of c). If the sum is greater, the products formed still contain free hydroxyl or amino groups. Preferably, however, the sum of the equivalents of a), b) and d) is approximately equal to the number of equivalents of c). The alcohols are advantageously added to the isocyanates in the presence of a catalyst such as dibutyltin dilaurate.

Component (B) is used in an amount of 5–50% by weight, preferably 20–40% by weight.

To prepare an aqueous dispersion, components (A) and (B) are mixed, and the mixture is admixed with an acid, for example formic acid, acetic acid or lactic acid, and then diluted to processing concentration. However, it is also possible to add the components (A) and (B) slowly to acidified water with stirring. To prepare electrocoating baths, the component mixture of (A) and (B) may additionally have added to it other binders and pigments in the form of a conventional pigment paste and further auxiliaries and additives customary in electrocoating, such as fillers, corrosion inhibitors, dispersants, defoamers, solvents or even further resin components. The electrocoating baths customarily have a solids content of from 5 to 30% by weight. Deposition customarily takes place at from 15 to 40° C. in the course of from 1 to 5 minutes at an applied voltage of from 50 to 500 volts. In cathodic electrocoating, the electrically conducting object to be coated, for example a copper, aluminum or steel sheet which may have been chemically pretreated, for example phosphatized, is connected as the cathode. The deposited film can be cured at from 120 to 200° C., preferably from 130 to 180° C., in the course of from 5 to 45, preferably from 10 to 30, minutes.

EXAMPLES

Preparation of component (A)

A mixture of 5,800 g of hexamethylenediamine, 7,250 g of dimeric fatty acid and 1,400 g of linseed oil fatty acid was slowly heated to 195° C., the water formed (540 g) being distilled off. The mixture was then cooled down to 100° C. and eluted with 5,961 g of toluene to a solids content of 70% by weight. The product had an amine number of 197 (g of KOH/100 g).

In a second stirred vessel, 10 equivalents of diglycidyl ether based on bisphenol A and epichlorohydrin having an equivalent weight of 485 (Epikote ® from Shell) was dissolved in a solvent mixture of 1,039 g of toluene and 1,039 g of isobutanol by heating. The solution thus formed was cooled down to 60° C. and admixed with 300.4 g of methylethanolamine and 128 g of isobutanol, the temperature rising to 78° C. in the course of 5 minutes. Thereafter 1,850 g of the condensation product obtained in the first stage were added, the mixture was heated at 80° C. for 2 hours.

Crosslinker 1

444.44 g of isophorone diisocyanate were dissolved in 111.1 g of toluene, 0.44 g of dibutyltin dilaurate was added, and the mixture was heated to 60° C. A mixture of 91.2 g of bisphenol A, 106.4 g of a reaction product of trimethylolpropane with three mol of ethylene oxide (polyol TP 30; from Perstorp), 65.9 g of toluene and 65.9 g of methyl isobutyl ketone was added dropwise in the course of an hour. The mixture was subsequently left to react for two hours until the NCO value was 9.5%. 258 g of dibutylamine were then added dropwise in such a way that the temperature did not rise above 80° C. The product was diluted to a solids content of 70% by weight and subsequently left to react for a further hour.

Crosslinker 2

444.44 g of isophorone diisocyanate were dissolved in 111.1 g of toluene, 0.44 g of dibutyltin dilaurate was added, and the mixture was heated to 60° C. A mixture of 136.8 g of bisphenol A, 70.8 g of the reaction product of trimethylolpropane with three mol of ethylene oxide (polyol TP 30; from Perstorp), 69.3 g of toluene and 69.3 g of methyl isobutyl ketone was added dropwise in the course of an hour. The mixture was subsequently left to react for two hours until the NCO value was 9.3%. 258 g of dibutylamine were then added dropwise in such a way that the temperature did not rise above 80° C. The product was diluted to a solids content of 70% by weight and subsequently left to react for a further hour.

Crosslinker 3 (comparative example relating to 1 and 2)

666.8 g of isophorone diisocyanate were dissolved in 566.1 g of toluene, 0.44 g of dibutyltin dilaurate was added, and the mixture was heated to 60° C. A mixture of 266.0 g of a reaction product of trimethylolpropane with three mol of ethylene oxide (polyol TP 30; from Perstorp) was added dropwise in the course of two hours. The mixture was subsequently left to react for two hours until the NCO value was 8.0%. 387.7 g of dibutylamine were then added dropwise in such a way that the temperature did not rise above 80° C. The product was diluted to a solids content of 70% by weight and subsequently left to react for a further hour.

Crosslinker 4

444.44 g of isophorone diisocyanate were dissolved in 111.1 g of toluene, 0.44 g of dibutyltin dilaurate was added, and the mixture was heated to 60° C. A mixture of 91.2 g of bisphenol A, 53.6 g of trimethylolpropane, 48.3 g of toluene and 48.3 g of methyl isobutyl ketone was added dropwise in the course of an hour. The mixture was subsequently left to react for two hours until the NCO value was 10.5%. 258 g of dibutylamine were then added dropwise in such a way that the temperature did not rise above 80° C. The product was diluted to a solids content of 70% by weight and subsequently left to react for a further hour.

Crosslinker 5 (comparative example relating to 4)

666.8 g of isophorone diisocyanate were dissolved in 509.5 g of toluene, 0.44 g of dibutyltin dilaurate was added and the mixture was heated to 60° C. 134.2 g of trimethylolpropane were then added dropwise in the course of two hours. The mixture was subsequently left to react for two hours. 387.7 g of dibutylamine were then added dropwise in such a way that the temperature did not rise above 80° C. The product was diluted to a solids content of 70% by weight and subsequently left to react for a further hour.

Crosslinker 6 (comparative example relating to -5)

500 g of a 75% strength by weight solution of a reaction product of one mol of trimethylolpropane with three mol of toluylene diisocyanate in ethyl acetate were mixed with 115.3 g of toluene and 0.5 g of dibutyltin dilaurate and heated to 60° C. 185 g of butylglycol were then added dropwise and, on completion of the addition, the mixture was subsequently left to react at 80° C. for one hour.

Pigment paste 168.7 g of butylglycol, 600 g of water and 17.7 g of acetic acid were added to 525.8 g of a binder referred to as component A1 in EP 167 029. 800 g of titanium dioxide, 11.0 g of carbon black and 50 g of basic lead silicate were then added, and the mixture was ball-milled to a particle size less than 9 μm. The millbase was then adjusted to a solids content of 48% by weight with water.

Electrocoating baths 685 g of binder were mixed with 293 g of crosslinker and the amount of acetic acid indicated in the table and also with sufficient water as to produce a solids content of 31% by weight. The organic solvents were then distilled off azeotropically under reduced pressure. The dispersion was adjusted with water to a solids content of 35% by weight and then mixed with 775 g of pigment paste and diluted with water to 5,000 ml. The baths were stirred at 30° C. for 168 hours. Films were deposited at 27° C. on steel panel cathodes in the course of 120 seconds and baked at the stated temperature for 20 minutes.

| Examples | Cross-linker | Acetic acid | U/V | Bake | LT | 480 h SSt | Yellow-ing |
|---|---|---|---|---|---|---|---|
| 1 | 1 | 15.6 | 240 | 155 | 24 | 1.0 | OK |
| 2 | 2 | 15.6 | 230 | 155 | 25 | 1.5 | OK |
| 3 | 3 | 14.7 | 240 | 155 | 25 | 2.3 | OK |
| 4 | 4 | 15.4 | 250 | 155 | 24 | 1.3 | OK |
| 5 | 5 | 13.8 | 250 | 155 | 22 | 2.5 | OK |
| 6 | 6 | 15.2 | 250 | 155 | 23 | 1.6 | not OK |

The dispersion for the bath prepared with crosslinker 6 was prepared by adding 13.7 g of dibutyltin dilaurate in the organic phase prior to dispersing.

| | |
|---|---|
| U/V | deposition voltage in V |
| Bake | baking temperature |
| LT | layer thickness in μm |
| 480 h SST | 480 hours salt spray test in accordance with German Standard Specification DIN 50021 |
| Yellowing | OK = no yellowing<br>not OK = yellowing |

We claim:
1. A heat-curable coating composition for cathodic electrocoating which becomes water-thinnable on protonation with an acid, containing
 (A) 50-95% by weight of a polycondensation or polyaddition product having an average molecular weight $\overline{M}_n$ of from 500 to 20,000 and containing primary and/or secondary hydroxyl groups and primary, secondary and/or tertiary amino groups, and (B) 5-50% by weight of a crosslinking agent obtain by reacting
  a) an aliphatic polyhydroxy compound and
  b) an aromatic polyhydroxy compound with
  c) an aliphatic and/or cycloaliphatic polyisocyanate and
  d) a blocking agent.

2. A coating composition as defined in claim 1, containing a polyetherpolyol as component a).

3. A coating composition as defined in claim 1, containing as component b) a phenol which contains two phenolic hydroxyl groups.

4. A coating composition as defined in claim 1, containing a diisocyanate having isocyanate groups of different reactivities.

5. A coating composition as defined in claim 1, containing isophorone diisocyanate as component c).

6. A coating composition as defined in claim 1, containing a dialkylamine as component d).

7. A process for preparing a coating by the cathodic electrocoating of an electrically conductive substrate, which comprises cathodically depositing a coating composition as defined in claim 1 in the form of an aqueous dispersion.

8. A process for preparing a coating as defined in claim 7, wherein pigments, fillers, coating aids, solvents or the mixture thereof are added to the coating composition.

* * * * *

UNITED STATES PATENT AND TRADEMARK OFFICE
CERTIFICATE OF CORRECTION

PATENT NO. : 5,188,716
DATED : February 23, 1993
INVENTOR(S) : SCHWERZEL et al.

It is certified that error appears in the above-identified patent and that said Letters Patent is hereby corrected as shown below:

ON THE COVER PAGE

Insert the following priority information on the cover page:
item
--[30] Foreign Application Priority Data Feb. 28, 1989 [DE] Fed. Rep. of Germany ..... 3906143--.
item [75]

Under Inventors Information, delete "Bad Durkheim" and insert --Bad Duerkheim--.
item [73]

Under Assignee, delete "Lack" and insert --Lacke--.

Signed and Sealed this

Thirtieth Day of November, 1993

Attest:

BRUCE LEHMAN

Attesting Officer

Commissioner of Patents and Trademarks